United States Patent
Spallek et al.

(10) Patent No.: US 12,276,451 B2
(45) Date of Patent: Apr. 15, 2025

(54) SUPPORT STRUCTURE FOR A CRYOGENIC SYSTEM AND CRYOGENIC SYSTEM

(71) Applicant: KIUTRA GMBH, Munich (DE)

(72) Inventors: Jan Spallek, Munich (DE); Felix Rucker, Munich (DE); Peter Schüssler, Munich (DE); Klaus Eibensteiner, Munich (DE); Mario Weisser, Munich (DE)

(73) Assignee: KIUTRA GMBH, Munich (DE)

(*) Notice: Subject to any disclaimer, the term of this patent is extended or adjusted under 35 U.S.C. 154(b) by 0 days.

(21) Appl. No.: 18/140,737

(22) Filed: Apr. 28, 2023

(65) Prior Publication Data

US 2023/0349624 A1    Nov. 2, 2023

(51) Int. Cl.
*F25D 29/00* (2006.01)
*F25B 21/00* (2006.01)
*F25D 19/00* (2006.01)

(52) U.S. Cl.
CPC ............ *F25D 19/006* (2013.01); *F25B 21/00* (2013.01); *F25D 19/003* (2013.01); *F25D 29/005* (2013.01)

(58) Field of Classification Search
CPC ..... G01N 1/42; F25D 2400/38; F25D 23/067; F25D 29/001; F25D 29/005; F25D 19/003; F25D 19/006; F25B 2500/13; F25B 21/00
See application file for complete search history.

(56) References Cited

U.S. PATENT DOCUMENTS

| | | | |
|---|---|---|---|
| 4,979,376 A | 12/1990 | Biehl et al. | |
| 8,925,334 B2 * | 1/2015 | Zimmermann | F25D 29/001 62/48.3 |
| 10,209,242 B2 | 2/2019 | Hoppin et al. | |
| 2005/0126187 A1 | 6/2005 | Li et al. | |
| 2011/0229928 A1 | 9/2011 | Dorward et al. | |
| 2018/0283762 A1 * | 10/2018 | Fujii | F25D 3/10 |

FOREIGN PATENT DOCUMENTS

| | | |
|---|---|---|
| CN | 108369050 A | 8/2018 |
| DE | 8812708 U1 | 1/1989 |
| DE | 20318094 U1 | 2/2004 |
| DE | 102009061068 A1 | 3/2011 |
| DE | 102014015665 A1 | 5/2016 |
| GB | 2408314 A | 5/2005 |
| JP | 2009052881 A * | 3/2009 |

OTHER PUBLICATIONS

First Office Action dated May 31, 2024 received in Chinese Application No. 202310470575.9, 10 pages.

* cited by examiner

*Primary Examiner* — Ana M Vazquez
(74) *Attorney, Agent, or Firm* — Scully, Scott, Murphy & Presser, P.C.

(57) ABSTRACT

Disclosed is a support structure for a cryogenic system with a first compartment, a second compartment, and a third compartment that are vertically stacked in this order; the first compartment configured to accommodate a cryostat; the second compartment configured to provide access to a top portion of the cryostat for performing measurements and/or tests on an object inside the cryostat; the third compartment configured to accommodate electronics for controlling at least the cryostat.

11 Claims, 3 Drawing Sheets

SUPPORT STRUCTURE FOR A CRYOGENIC SYSTEM AND CRYOGENIC SYSTEM

FIELD

The present disclosure relates to a support structure for a cryogenic system and a cryogenic system having the support structure. More particularly, the present disclosure relates to a mobile cryogenic system for low-vibration optical measurements at cryogenic temperatures.

BACKGROUND

A cryostat is generally used to maintain low temperatures of samples mounted within the cryostat. Low temperatures may be achieved by using, for example, a cryogenic fluid bath such as liquid helium. However, the cooling medium, such as liquid helium, continuously evaporates due to external and/or internal heat input in the cryostat and therefore needs to be refilled regularly. This requires considerable time and resources, whereby the operating costs of such cryostats are high.

To overcome the above drawbacks, cryogen-free cryostats have been developed. Cryogen-free cryostats may employ a cryogen-free closed cycle system, such a pulse tube cryocooler. Modern pulse tube cryocoolers can achieve temperatures down to 1.2 K. To achieve sub-Kelvin temperatures, a magnetic cooling stage can be used in addition to the cryogen-free closed cycle system. The magnetic cooling stage may be an adiabatic demagnetization refrigerator (ADR), which can achieve temperatures down to a few milli-Kelvin. ADR is based on the magneto-caloric effect. When a medium is magnetized, its magnetic moments get aligned and the heat of magnetization is released. Vice versa, if the medium is demagnetized its temperature drops.

Cryostats can be used to perform experiments on objects, such as scientific materials and electronics, at low temperatures. Many experiments, such as optical experiments, require low vibration during measurements. However, parts of the cryostat such as pumps and pulse-tube cryocoolers generally generate such unwanted vibrations. In addition, conventional cryostat systems have a large footprint and therefore take up valuable space in factories and laboratories.

In view of the above, new support structures for a cryogenic system and cryogenic systems having the support structure, that overcome at least some of the problems in the art are beneficial.

SUMMARY

It is an object of the present disclosure to provide a support structure for a cryogenic system and a cryogenic system having the support structure that can reduce vibrations during operation of the cryogenic system, particularly during measurements on objects. In is another object of the present disclosure to provide a support structure for a cryogenic system and a cryogenic system having the support structure, which can reduce the footprint of the cryogenic system and/or allow flexible use of the cryogenic system.

Further aspects, benefits, and features of the present disclosure are apparent from the claims, the description, and the accompanying drawings.

According to an independent aspect of the present disclosure, a support structure for a cryogenic system is provided. The support structure includes a first compartment, a second compartment, and a third compartment. The first compartment is configured to accommodate a cryostat. The second compartment is configured to provide access to a top portion of the cryostat for performing measurements and/or tests on (or exchanging) an object inside the cryostat. The third compartment is configured to accommodate electronics for controlling at least the cryostat.

The first compartment may be referred to as cryo or cryostat compartment. Additionally, or alternatively, the second compartment may be referred to as measurement and/or test compartment. Additionally, or alternatively, the third compartment may be referred to as control compartment.

According to some embodiments, which can be combined with other embodiments described herein, the object inside the cryostat is a sample. The terms "object" and "sample" as used throughout the present disclosure include, but are not limited to, scientific materials, electronics (e.g., superconducting electronics), active devices, passive devices, processing units, and combinations thereof.

Preferably, the object is connected to a cold stage of the cryostat. The cryostat can be configured to cool the object to a temperature in range between 5 mK and 300 K, particularly in a range between 5 mK and 250 K, particularly in a range between 5 mK and 200 K, particularly in a range between 5 mK and 150 K, particularly in a range between 5 mK and 100 K, and more particularly in a range between 5 mK and about 70 K. In some implementations, even if the system is a cryostat, temperatures up to room temperature can be provided to conduct measurements and/or tests on objects.

According to some embodiments, which can be combined with other embodiments described herein, the first compartment, the second compartment, and the third compartment are vertically stacked in this order.

According to some embodiments, which can be combined with other embodiments described herein, the support structure is a mobile support structure. In other words, the support structure is movable and not immovably installed in a factory or laboratory.

According to some embodiments, which can be combined with other embodiments described herein, the support structure further includes a plurality of wheels arranged at a lower side of the first compartment.

According to some embodiments, which can be combined with other embodiments described herein, the support structure further includes supporting means in the first compartment. The supporting means is configured to support the cryostat.

According to some embodiments, which can be combined with other embodiments described herein, the support structure further includes one or more flexible elements insertable between the supporting means and the cryostat.

Preferably, the one or more flexible elements include, or are made of, rubber. However, the present disclosure is not limited thereto, and the one or more flexible elements can include, or be made of, another flexible material.

According to some embodiments, which can be combined with other embodiments described herein, the cryostat is supported only by the supporting means with the one or more flexible elements therebetween and without a rigid connection between the support structure and the cryostat. In other words, there is no other connection between the support structure and the cryostat such that the cryostat is held by a floating mount.

According to some embodiments, which can be combined with other embodiments described herein, the second compartment is configured such that the top portion of the cryostat at least partially extends into the second compartment. In particular, the top portion of the cryostat can extend from the first compartment into the second compartment so that at least a part of the top portion is located inside the second compartment.

According to some embodiments, which can be combined with other embodiments described herein, the support structure further includes an auxiliary structure for performing measurements and/or tests on the object inside the cryostat. The auxiliary structure may provide mounting structures for mounting devices thereon and the like.

Preferably, the auxiliary structure is partially or fully located inside the second compartment.

According to some embodiments, which can be combined with other embodiments described herein, the support structure further includes damping means between the support structure and the auxiliary structure to provide vibration decoupling between the support structure and the auxiliary structure.

Preferably, the auxiliary structure is supported only by the damping means without a rigid connection between the support structure and the auxiliary structure. In other words, there is no other connection between the support structure and the auxiliary structure.

According to some embodiments, which can be combined with other embodiments described herein, the damping means are selected from the group including (or consisting of) air dampers, rubber dampers, active electrical dampers, passive mechanical dampers, active mechanical dampers, and combinations thereof.

According to some embodiments, which can be combined with other embodiments described herein, the auxiliary structure extends over the top portion of the cryostat. In other words, the top portion of the cryostat is located below the auxiliary structure.

According to some embodiments, which can be combined with other embodiments described herein, the auxiliary structure includes at least one optically transparent area.

Preferably, the at least one optically transparent area is a hole in the auxiliary structure or an optical window, such as a glass window. In a preferred embodiment, the at least one optically transparent area is a hole in the auxiliary structure.

According to some embodiments, which can be combined with other embodiments described herein, the auxiliary structure is configured to provide access to at least one optical window at an upper side and/or at least one side of the top portion of the cryostat. For example, the at least one optically transparent area of the auxiliary structure, such as the hole, allows access to the top portion of the cryostat.

According to some embodiments, which can be combined with other embodiments described herein, the auxiliary structure is connected to a flexible element of the top portion of the cryostat to provide vibration decoupling at least between the auxiliary structure and the cryostat. For example, the flexible element can be a bellows, such as a rubber bellows.

According to some embodiments, which can be combined with other embodiments described herein, the second compartment is configured for performing optical measurements and/or tests on the object inside the cryostat.

Preferably, the optical measurements and/or tests use optical beams, such as laser beams.

According to some embodiments, which can be combined with other embodiments described herein, the second compartment is configured to provide optical access to an upper side and/or at least one side of the top portion of the cryostat.

Preferably, the second compartment is configured to provide direct beam optical access to the upper side and/or the at least one side of the top portion of the cryostat.

According to some embodiments, which can be combined with other embodiments described herein, the second compartment is configured to provide optical access to the at least one side of the top portion of the cryostat for an optical table located horizontally adjacent the support structure. Accordingly, the support structure does not include or support an optical table.

Preferably, the second compartment is configured to provide the optical access for the optical table located at essentially the same height as the second compartment.

According to some embodiments, which can be combined with other embodiments described herein, the second compartment is configured to provide access to an interior of the cryostat via the top portion thereof for insertion and/or removal of the object. For example, the top portion may include, or be connectable to, a load lock configured for loading the object into the cryostat. In some embodiments, the load lock may be accessible via the second compartment.

According to some embodiments, which can be combined with other embodiments described herein, the support structure further includes a plurality of frame elements defining the first compartment, the second compartment, and the third compartment.

Preferably, the support structure further includes one or more walls and/or one or more doors attached to the plurality of frame elements. The one or more walls and/or one or more doors can at least partially enclose the interior space of the support structure.

According to some embodiments, which can be combined with other embodiments described herein, the support structure is a rack.

According to some embodiments, which can be combined with other embodiments described herein, the support structure has a 19" rack form factor.

According to another independent aspect of the present disclosure, a cryogenic system is provided. The cryogenic system includes the support structure of the present disclosure and the cryostat in the first compartment of the support structure.

According to some embodiments, which can be combined with other embodiments described herein, the top portion of the cryostat includes at least one cold stage thermally connectable to the object.

The cold stage can be configured to cool the object to a temperature in range between 5 mK and 300 K, particularly in a range between 5 mK and 250 K, particularly in a range between 5 mK and 200 K, particularly in a range between 5 mK and 150 K, particularly in a range between 5 mK and 100 K, and more particularly in a range between 5 mK and about 70 K. In some implementations, even if the system is a cryostat, temperatures up to room temperature can be provided to conduct measurements and/or tests on objects.

According to some embodiments, which can be combined with other embodiments described herein, the top portion of the cryostat includes a magnet device configured to apply a magnetic field to the object.

Preferably, the magnet device includes at least one superconducting magnet and/or at least one (conventional or resistive) electromagnet and/or at least permanent magnet.

According to some embodiments, which can be combined with other embodiments described herein, the cryogenic system further includes a measurement and/or test setup in the second compartment for performing measurements and/or tests on the object inside the cryostat.

Preferably, the measurement and/or test setup is an optical measurement setup.

According to some embodiments, which can be combined with other embodiments described herein, the cryogenic system further includes the electronics in the third compartment.

Preferably, the electronics includes control electronics for controlling the cryostat and measurement and/or test electronics for performing the measurements and/or tests on the object inside the cryostat.

According to some embodiments, which can be combined with other embodiments described herein, the cryogenic system further includes wiring extending from the electronics to the cryostat and/or the second compartment.

Preferably, the wiring includes control wiring for controlling the cryostat and/or the measurement and/or test setup. Additionally, or alternatively, the wiring may include measurement and/or test wiring for measurement and/or test signals.

Preferably, the wiring includes DC wiring and/or RF wiring.

According to some embodiments, which can be combined with other embodiments described herein, the cryogenic system further includes at least one operational device configured for operating the cryostat, wherein the at least one operational device is located in the first compartment and/or the third compartment.

Preferably, the at least one operational device includes, or is, a compressor, in particular a Helium compressor.

According to some embodiments, which can be combined with other embodiments described herein, the cryogenic system is configured for automatic operation. In particular, measurements and/or tests can be conducted fully automatically by the cryogenic system.

According to some embodiments, which can be combined with other embodiments described herein, the cryostat is an adiabatic demagnetization refrigerator.

Preferably, the cryostat is a multi-stage adiabatic demagnetization refrigerator.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Figure 1A:
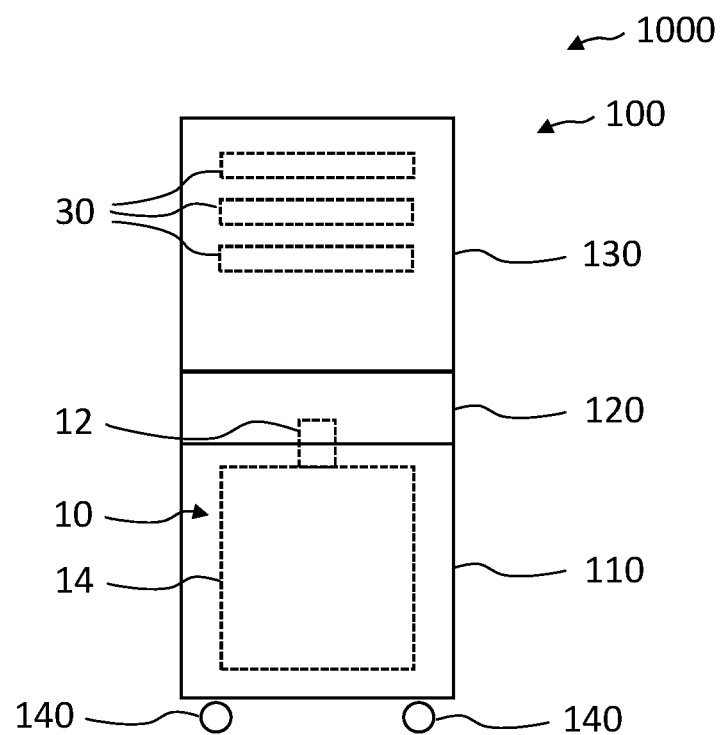
FIG. 1A shows a front view of a cryogenic system according to embodiments described herein.
Figure 1B:
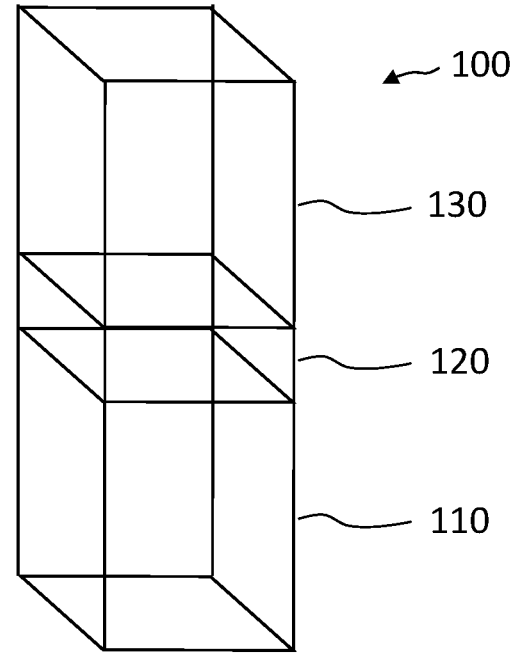
FIG. 1B shows a perspective view of a support structure for a cryogenic system according to embodiments described herein.

FIG. 1A shows a front view of a cryogenic system 1000 according to embodiments described herein. FIG. 1B, shows a perspective view of a support structure 100 of the cryogenic system 1000 according to embodiments described herein.

The support structure 100 includes a first compartment 110, a second compartment 120, and a third compartment 130. The first compartment 110 is configured to accommodate a cryostat 10. Accordingly, the first compartment 110 may be referred to as cryo or cryostat compartment. The second compartment 120 is configured to provide access to a top portion 12 of the cryostat 10 for performing measurements on an object inside the cryostat 10. Accordingly, the second compartment 120 may be referred to as measurement and/or test compartment. The third compartment 130 is configured to accommodate electronics 30 for controlling at least the cryostat 10. Accordingly, the third compartment 130 may be referred to as electronics or control compartment.

The cryogenic system 1000 can be configured to perform measurements and/or tests on the object inside the cryostat 10 automatically. In some embodiments, the cryostat can be an adiabatic demagnetization refrigerator, such as a multi-stage adiabatic demagnetization refrigerator.

The cryostat 10 can include the top portion 12 and a vacuum chamber 14. The vacuum chamber 14 has an interior space which is configured to contain a vacuum. The vacuum chamber 14 seals the interior space from the outside essentially gas-tight, vacuum-tight, heat-impermeable, and/or radiation-impermeable. Optionally, the vacuum chamber 14 may electrically insulate the interior space from the outside.

A vacuum is generally understood as a space essentially devoid of matter. The term "vacuum" as used throughout the present application is in particular understood as a technical vacuum, i.e., a region with a gaseous pressure much less than atmospheric pressure. The vacuum inside the vacuum chamber 14 can be high vacuum or ultra-high vacuum. One or more vacuum generation sources, such as turbo pumps and/or cryo pumps (not shown), can be connected to the vacuum chamber 14 to generate the vacuum.

The top portion 12 of the cryostat 10 is connected to the vacuum chamber 14 or forms a part of the vacuum chamber 14. In particular, the top portion 12 may have an interior space that is in communication with the interior space of the vacuum chamber 14. Accordingly, the interior space of the top portion 12 can be configured to contain a vacuum.

In some embodiments, a cold stage (not shown) is located in the interior space of the top portion 12. The cold stage can be thermally connectable to the object to cool the object to a temperature in range between 5 mK and 300 K, particularly in a range between 5 mK and 250 K, particularly in a range between 5 mK and 200 K, particularly in a range between 5 mK and 150 K, particularly in a range between 5 mK and 100 K, and more particularly in a range between 5 mK and about 70 K. In some implementations, temperatures up to room temperature can be provided to conduct measurements and/or tests on objects.

The top portion 12 of the cryostat 10 may include a load lock configured for loading the object into the cryostat 10. In some embodiments, the load lock may be accessible via the second compartment 120.

In some embodiments, top portion 12 can include a magnet device configured to apply a magnetic field to the object. The magnet device can include, but is not limited to, a superconducting magnet and/or a resistive electromagnet.

The first compartment 110, the second compartment 120, and the third compartment 130 are vertically stacked in this order. Accordingly, the second compartment 120 is arranged between the first compartment 110 and the third compartment 130. In particular, an upper side of the second compartment 120 can be directly adjacent to a lower side of the third apartment 130, and a lower side of the second compartment 120 can be directly adjacent to an upper side of the first apartment 110.

The term "vertical" is understood to distinguish over "horizontal". That is, "vertical" relates to an essentially vertical arrangement of the first compartment 110, the second compartment 120, and the third compartment 130, wherein a deviation of a few degrees, e.g., up to 10° or even up to 15°, from an exact vertical arrangement is still considered a "vertical arrangement" or "essentially vertically". The vertical direction can be essentially parallel to the force of gravity.

The vertical arrangement of the first compartment 110, the second compartment 120, and the third compartment 130 can minimize a footprint of the cryogenic system 1000. Accordingly, the cryogenic system 1000 therefore takes up less space in factories and laboratories.

According to some embodiments, the support structure 100 includes a plurality of frame elements defining the first compartment 110, the second compartment 120, and the third compartment 130. Optionally, one or more walls and/or one or more doors can be attached to the plurality of frame elements. The one or more walls and/or one or more doors can at least partially enclose the interior space of the support structure 100.

In some embodiments, the support structure 100 is a mobile support structure. In other words, the support structure 100 is movable and not immovably installed in a factory or laboratory. For example, the support structure 100 can further includes 140 a plurality of wheels, such as four wheels, arranged at a lower side of the first compartment 110 such that the cryogenic system 1000 can be freely moved. Accordingly, the cryogenic system 1000 of the present disclosure is more flexible than conventional cryogenic systems.

The third compartment 130 of the support structure 100 accommodates electronics 30. The electronics 30 may include control electronics for controlling the cryostat and measurement and/or test electronics for performing the measurements and/or tests on the object inside the cryostat 10.

In some embodiments, the cryogenic system 1000 further includes wiring extending from the electronics 30 to the cryostat 10 and/or the second compartment 120, such as DC wiring and/or RF wiring. The wiring may include control wiring for controlling the cryostat 10 and/or a measurement and/or test setup in the second compartment 120. Additionally, or alternatively, the wiring may include measurement and/or test wiring for measurement and/or test signals.

The cryogenic system 1000 may further include at least one operational device configured for operating the cryostat, such as a Helium compressor and/or a pulse tube cooler. In some embodiments, the at least one operational device can be located in the third compartment 130.

Figure 2:
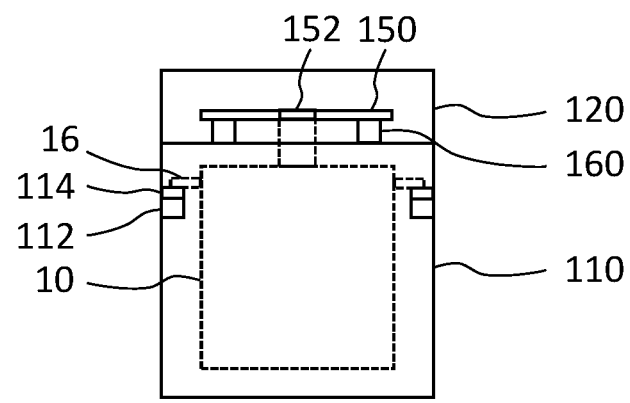
FIG. 2 shows a first compartment and a second compartment of a support structure for a cryogenic system according to embodiments described herein.

FIG. 2 shows a first compartment 110 and a second compartment 120 of a support structure for a cryogenic system according to embodiments described herein.

The support structure includes supporting means in the first compartment 110 for supporting the cryostat 10. The supporting means may include one or more first support elements 112 configured to support corresponding one or more second support elements 16 of the cryostat 10. In some embodiments, the one or more second support elements 16 can horizontally protrude from the vacuum chamber 14 of the cryostat 10.

The support structure may further include one or more flexible elements 114 between the supporting means and the cryostat 10, in particular between the one or more first support elements 112 and the one or more second support elements 16. Accordingly, the cryostat 10 is supported only by the supporting means with the one or more flexible elements 114 therebetween and without a rigid connection between the support structure and the cryostat 10. In other words, there is no other connection between the support structure and the cryostat 10 such that the cryostat 10 is held by a floating mount. Thereby, vibrations generated by the cryostat 10 can be prevented from being transferred to the support structure.

A shown in FIG. 2, the top portion 12 of the cryostat 10 extends into the second compartment 120 such that at least a part of the top portion 12 is located inside the second compartment 120. The second compartment 120 thus allows access to the top portion 12 of the cryostat 10 for measurements and/or tests on the object.

In some embodiments, the support structure further includes an auxiliary structure 150 inside the second compartment 120 and which extends over the top portion 12 of the cryostat 10. The auxiliary structure 150 may provide mounting structures for mounting devices thereon used in measurements and/or tests. Additionally, or alternatively, the auxiliary structure 150 includes at least one optically transparent area 152, such as a hole, to allow access to the top portion 12 of the cryostat 10.

The auxiliary structure 150, in particular a lower side thereof, can be connected to a flexible element of the top portion 12 of the cryostat 10 to provide vibration decoupling at least between the auxiliary structure 150 and the cryostat 10. For example, the flexible element can be a bellows, such as a rubber bellows.

In some embodiments, the support structure may further include damping means 160 between the support structure and the auxiliary structure 150 to provide vibration decoupling between the support structure and the auxiliary structure 150. In particular, the auxiliary structure 150 may be supported by the damping means 160 without a rigid connection between the support structure and the auxiliary structure 150. In other words, there is no other connection between the support structure and the auxiliary structure 150.

The damping means can include, but are not limited to, air dampers, rubber dampers, active electrical dampers, passive mechanical dampers, active mechanical dampers, and combinations thereof.

Many experiments, such as optical experiments, require low vibration during measurements. However, parts of the cryostat 10 such as pumps and pulse-tube cryocoolers generally generate such unwanted vibrations. The vibration damping provided by the floating mount of the cryostat 10 and/or the damping device 160 for the auxiliary structure 150 can reduce vibration to a level acceptable even for sensitive optical measurements. Accordingly, the vertical arrangement of the compartments combined with the vibration damping allows for both a small footprint of the cryogenic system and low vibration.

Figure 3A:
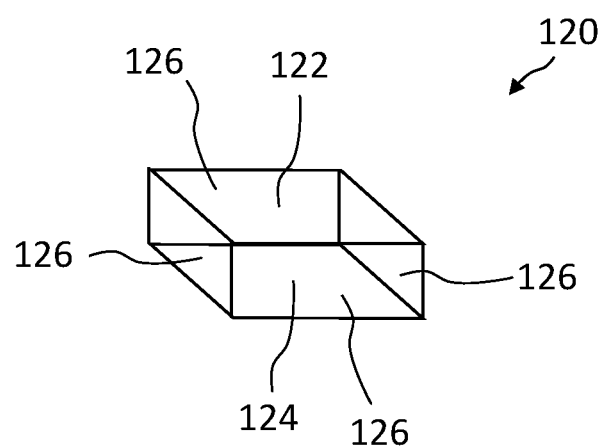
FIG. 3A shows a perspective view of a second compartment of a support structure for a cryogenic system according to embodiments described herein.
Figure 3B:
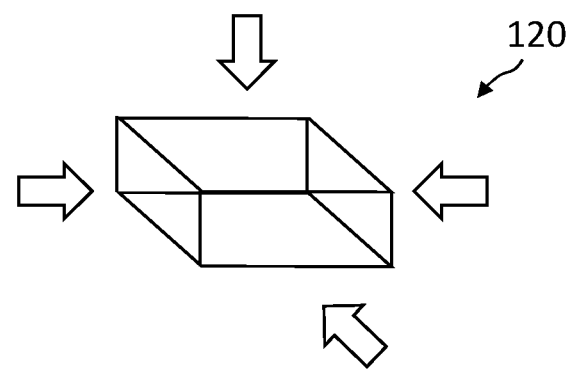
FIG. 3B shows another perspective view of a second compartment of a support structure for a cryogenic system according to embodiments described herein.

FIGS. 3A and 3B show perspective views of a second compartment 120 of a support structure for a cryogenic system according to embodiments described herein.

The second compartment 120 includes a horizontal upper side 122, a horizontal lower side 124 and four vertical (or lateral) sides 126 connecting the horizontal upper side 122 and the horizontal lower side 124.

The second compartment 120, in particular a size and/or geometry thereof, can be configured for performing measurements and/or tests, such as optical measurements and/or tests, on the object inside the cryostat. For example, as shown in FIG. 3B, the optical measurements and/or tests can use optical beams, such as laser beams, which can be provided to the second compartment 120 from multiple sides, in particular the horizontal upper side 122 and one or more of the vertical sides 126, such as a front side, a left side and a right side.

The second compartment 120 may provide optical access, such as direct beam access, to an upper side and/or at least one (lateral) side of the top portion of the cryostat. For example, one or more optical windows can be provided at the upper side and/or the at least one side of the top portion such that beams entering the second compartments 120 from the outside (or beams generated by a beam source located in the second compartment 120) can be irradiated onto the object inside the cryostat.

In some embodiments, the second compartment 120, in particular a size and/or geometry thereof, can be further configured to provide access to the interior of the cryostat via the top portion thereof for insertion and/or removal of the object. For example, the top portion may include, or be connectable to, a load lock configured for loading the object into the cryostat. In some embodiments, the load lock may be accessible via the second compartment 120.

Figure 4:
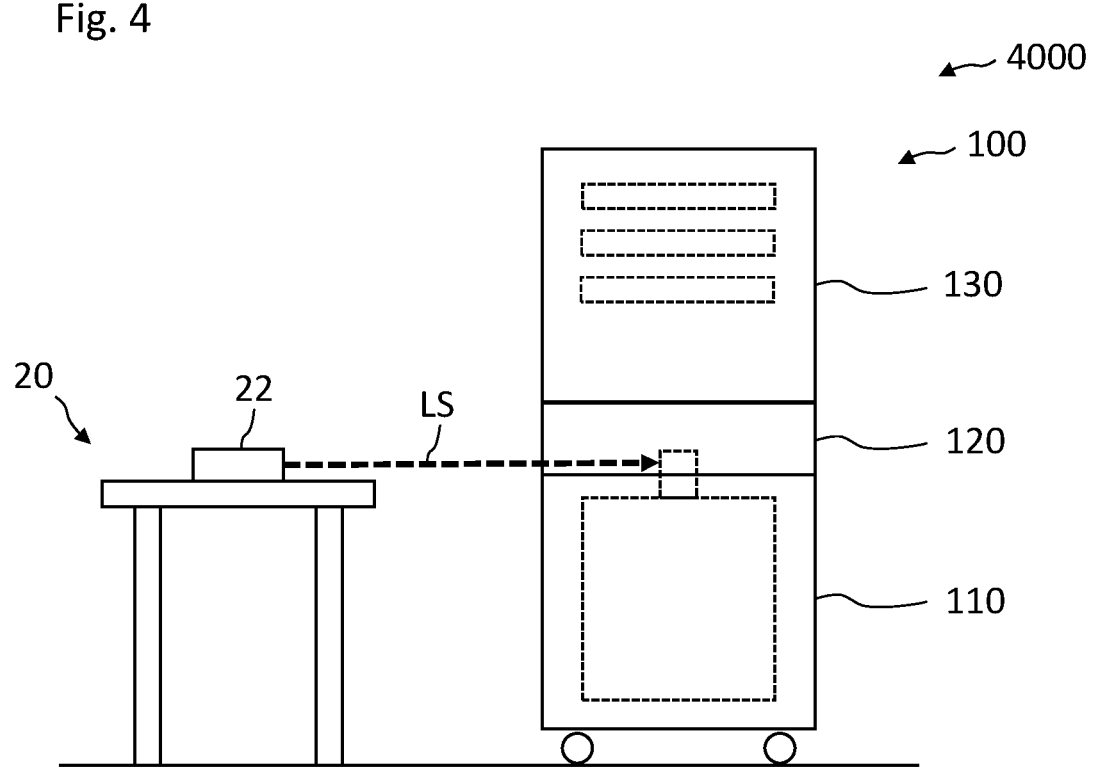
FIG. 4 shows a cryogenic system according to further embodiments described herein.

FIG. 4 shows a cryogenic system 4000 according to further embodiments described herein.

The second compartment 120 of the cryogenic system 4000 is configured to provide optical access to the at least one side of the top portion of the cryostat for an optical table 20 located horizontally adjacent the support structure 100. In some embodiments, the optical table 20 can be located at essentially the same height as the second compartment 120. Accordingly, the support structure does not include or support an optical table.

The optical table 20 can include a beam source 22 configured to provide a beam LS used in an optical experiment and/or test on the object inside the cryostat. The beam LS can enter a lateral side of the second compartment 120 and enter the cryostat via one or more optical windows provided at a lateral side of the top portion. Such an arrangement of the optical table outside the support structure allows flexible use of the cryogenic system 4000.

EXAMPLES

In a first example, a support structure for a cryogenic system is provided. The support structure includes a first compartment, a second compartment, and a third compartment, wherein the first compartment, the second compartment, and the third compartment are vertically stacked in this order, wherein the first compartment is configured to accommodate a cryostat, wherein the second compartment is configured to provide access to a top portion of the cryostat for performing measurements and/or tests on (or exchanging) an object inside the cryostat, and wherein the third compartment is configured to accommodate electronics for controlling at least the cryostat.

In a second example, which is based on the first example, the support structure is a mobile support structure.

In a third example, which is based on the first or second example, the support structure further includes a plurality of wheels arranged at a lower side of the first compartment.

In a fourth example, which is based on any one of the previous examples, the support structure further includes supporting means in the first compartment, wherein the supporting means is configured to support the cryostat.

In a fifth example, which is based on any one of the previous examples, the support structure further includes one or more flexible elements insertable between the supporting means and the cryostat.

In a sixth example, which is based on the fifth example, the one or more flexible elements include, or are made of, rubber.

In a seventh example, which is based on the fifth or sixth example, the cryostat is supported only by the supporting means with the one or more flexible elements therebetween and without a rigid connection between the support structure and the cryostat.

In an eight example, which is based on any one of the previous examples, the second compartment is configured such that the top portion of the cryostat at least partially extends into the second compartment.

In a ninth example, which is based on any one of the previous examples, the support structure further includes an auxiliary structure for performing measurements and/or tests on the object inside the cryostat, wherein the auxiliary structure is located inside the second compartment.

In a tenth example, which is based on the ninth example, the support structure further includes damping means between the support structure and the auxiliary structure to provide vibration decoupling between the support structure and the auxiliary structure.

In an eleventh example, which is based on the tenth example, the damping means are selected from the group consisting of air dampers, rubber dampers, active electrical dampers, passive mechanical dampers, active mechanical dampers, and combinations thereof.

In a twelfth example, which is based on any one of the previous examples nine to eleven, the auxiliary structure extends over the top portion of the cryostat.

In a thirteenth example, which is based on any one of the previous examples nine to twelve, the auxiliary structure includes at least one optically transparent area.

In a fourteenth example, which is based on the thirteenth example, the at least one optically transparent area is a hole in the auxiliary structure or an optical window.

In a fifteenth example, which is based on any one of the previous examples nine to fourteen, the auxiliary structure is configured to provide access to at least one optical window at an upper side and/or at least one side of the top portion of the cryostat.

In a sixteenth example, which is based on any one of the previous examples nine to fifteen, the auxiliary structure is connected to a flexible element of the top portion of the cryostat to provide vibration decoupling at least between the auxiliary structure and the cryostat.

In a seventeenth example, which is based on any one of the previous examples, the second compartment is configured for performing optical measurements and/or tests on the object inside the cryostat.

In an eighteenth example, which is based on any one of the previous examples, the second compartment is configured to provide optical access to an upper side and/or at least one side of the top portion of the cryostat.

In a nineteenth example, which is based on the eighteenth example, the second compartment is configured to provide direct beam optical access to the upper side and/or the at least one side of the top portion of the cryostat In a twentieth example, which is based on the eighteenth or nineteenth example, the second compartment is configured to provide optical access to the at least one side of the top portion of the cryostat for an optical table located horizontally adjacent the support structure.

In a twenty-first example, which is based on the twentieth example, the second compartment is configured to provide the optical access for the optical table located at essentially the same height as the second compartment.

In a twenty-second example, which is based on any one of the previous examples, the second compartment is configured to provide access to an interior of the cryostat via the top portion thereof for insertion and/or removal of the object.

In a twenty-third example, which is based on any one of the previous examples, the support structure further includes a plurality of frame elements defining the first compartment, the second compartment, and the third compartment.

In a twenty-fourth example, which is based on any one of the previous examples, the support structure is a rack.

In a twenty-fifth example, which is based on any one of the previous examples, the support structure has a 19" rack form factor.

In a twenty-sixth example, a cryogenic system is provided. The cryogenic system includes the support structure of any one of the first to twenty-fifth examples and the cryostat in the first compartment.

In a twenty-seventh example, which is based on the twenty-sixth example, the top portion of the cryostat includes a cold stage thermally connectable to the object.

In a twenty-eight example, which is based on the twenty-sixth or twenty-seventh example, the top portion of the cryostat includes a magnet device configured to apply a magnetic field to the object.

In a twenty-ninth example, which is based on the twenty-eighth example, the magnet device includes at least one superconducting magnet and/or at least one electromagnet.

In a thirtieth example, which is based on any one of the previous examples twenty-six to twenty-nine, the cryogenic system further includes a measurement and/or test setup in the second compartment for performing measurements and/or tests on the object inside the cryostat.

In a thirty-first example, which is based on the thirtieth example, the measurement and/or test setup is an optical measurement setup.

In a thirty-second example, which is based on any one of the examples twenty-six to thirty-one, the cryogenic system further includes the electronics in the third compartment.

In a thirty-third example, which is based on the thirty-second example, the electronics includes control electronics for controlling the cryostat and measurement and/or test electronics for performing the measurements and/or tests on the object inside the cryostat.

In a thirty-fourth example, which is based the thirty-second or thirty-third example, the cryogenic system further includes wiring extending from the electronics to the cryostat and/or the second compartment.

In a thirty-fifth example, which is based on the thirty-fourth example, wherein the wiring includes DC wiring and/or RF wiring.

In a thirty-sixth example, which is based on any one of the examples twenty-six to thirty-five, the cryogenic system further includes at least one operational device configured for operating the cryostat, wherein the at least one operational device is located in the first compartment and/or the third compartment.

In a thirty-seventh example, which is based on the thirty-sixth example, the at least one operational device includes, or is, a compressor, in particular a Helium compressor.

In a thirty-eighth example, which is based on any one of the examples twenty-six to thirty-seven, the cryogenic system is configured for automatic operation.

In a thirty-ninth example, which is based on any one of the examples twenty-six to thirty-eighth, the cryostat is an adiabatic demagnetization refrigerator.

In a fortieth example, which is based on any one of the examples twenty-six to thirty-nine, the cryostat is a multi-stage adiabatic demagnetization refrigerator.

While the foregoing is directed to embodiments of the disclosure, other and further embodiments of the disclosure may be devised without departing from the basic scope thereof, and the scope thereof is determined by the claims that follow.

The invention claimed is:
1. A support structure for a cryogenic system, comprising:
a first compartment, a second compartment, and a third compartment, each of the first compartment, the second compartment, and the third compartment forming a respective interior,
wherein the first compartment, the second compartment, and the third compartment are vertically stacked in this order,
wherein the first compartment is configured to accommodate a cryostat,
wherein the second compartment is configured to provide access to a top portion of the cryostat for performing measurements and/or tests on an object inside the cryostat, wherein the top portion of the cryostat at least partially extends into the second compartment, and wherein the top portion of the cryostat includes a cold stage thermally connectable to the object, and
wherein the third compartment is configured to accommodate electronics for controlling at least the cryostat,
wherein the support structure further includes:
one or more supports configured to support the cryostat; and
one or more flexible elements between the one or more supports and the cryostat.
2. The support structure of claim 1, wherein the support structure is a mobile support structure and/or further includes a plurality of wheels arranged at a lower side of the first compartment.
3. The support structure of claim 1, wherein:
the one or more flexible elements include, or are made of, rubber; and/or
the cryostat is supported by the one or more supports with the one or more flexible elements therebetween and without a rigid connection between the support structure and the cryostat.
4. The support structure of claim 1, further including:
an auxiliary structure for performing measurements and/or tests on the object inside the cryostat; and
damping means between the support structure and the auxiliary structure to provide vibration decoupling between the support structure and the auxiliary structure, in particular wherein the damping means are selected from the group consisting of air dampers, rubber dampers, active electrical dampers, passive mechanical dampers, active mechanical dampers, and combinations thereof.

5. The support structure of claim 4, wherein:

the auxiliary structure extends over the top portion of the cryostat; and/or the auxiliary structure includes at least one optically transparent area; and/or the auxiliary structure is configured to provide access to at least one optical window at an upper side and/or at least one side of the top portion of the cryostat; and/or the auxiliary structure is connected to a flexible element of the top portion of the cryostat to provide vibration decoupling at least between the auxiliary structure and the cryostat.

6. The support structure of claim 1, wherein:

the second compartment is configured for performing optical measurements and/or tests on the object inside the cryostat; and/or the second compartment is configured to provide optical access to an upper side and/or at least one side of the top portion of the cryostat; and/or the second compartment is configured to provide direct beam optical access to the upper side and/or the at least one side of the top portion of the cryostat; and/or the second compartment is configured to provide optical access to the at least one side of the top portion of the cryostat for an optical table located horizontally adjacent the support structure; and/or the second compartment is configured to provide the optical access for the optical table located at essentially the same height as the second compartment; and/or the second compartment is configured to provide access to an interior of the cryostat via the top portion thereof for insertion and/or removal of the object.

7. The cryogenic system of claim 1, wherein the one or more supports comprise one or more first supports configured to support corresponding one or more second supports of the cryostat.

8. A cryogenic system, comprising:

a cryostat a support structure comprising a first compartment, a second compartment, and a third compartment, wherein the first compartment, the second compartment, and the third compartment are vertically stacked in this order, wherein the first compartment is configured to accommodate a cryostat, the second compartment is configured to provide access to a top portion of the cryostat for performing measurements and/or tests on an object inside the cryostat, and the third compartment is configured to accommodate electronics for controlling at least the cryostat;

wherein the cryostat is in the first compartment, and wherein the top portion of the cryostat at least partially extends into the second compartment, and wherein the top portion of the cryostat includes a cold stage thermally connectable to the object.

9. The cryogenic system of claim 8, wherein:

the top portion of the cryostat includes a magnet device configured to apply a magnetic field to the object.

10. The cryogenic system of claim 8, further including:

a measurement and/or test setup in the second compartment for performing measurements and/or tests on the object inside the cryostat, in particular wherein the measurement and/or test setup is an optical measurement setup; and/or the electronics in the third compartment, wherein the electronics includes control electronics for controlling the cryostat and measurement and/or test electronics for performing the measurements and/or tests on the object inside the cryostat; and/or wiring extending from the electronics to the cryostat and/or the second compartment, in particular wherein the wiring includes DC wiring and/or RF wiring; and/or at least one operational device configured for operating the cryostat, wherein the at least one operational device is located in the first compartment and/or the third compartment, in particular wherein the at least one operational device includes, or is, a compressor or a Helium compressor.

11. The cryogenic system of claim 8, wherein:

the cryogenic system is configured for automatic operation; and/or the cryostat is an adiabatic demagnetization refrigerator, in particular a multi-stage adiabatic demagnetization refrigerator.

* * * * *